Nov. 14, 1961  S. LEES  3,008,334
ACCELEROMETER
Filed April 25, 1957

INVENTOR.
Sidney Lees
BY
his atty

United States Patent Office 3,008,334
Patented Nov. 14, 1961

3,008,334
ACCELEROMETER
Sidney Lees, 544 Walnut St., Newton, Mass.
Filed Apr. 25, 1957, Ser. No. 655,035
14 Claims. (Cl. 73—503)

This invention relates to acceleration measuring devices and more particularly comprises a new and improved integrating accelerometer.

In recent years accelerometers employing liquid as the seismic or sensing element have been developed. Although instruments of this type have particular features which are better suited for many applications than those instruments which employ a solid mass as the seismic element, they too have many limitations which detract from their usefulness and adversely effect their accuracy.

All of the liquid-type accelerometers heretofore developed depend upon the free surface of the liquid for the measurement of the response. When such an instrument experiences a high input acceleration, the sloshing of the free surfaces makes it difficult, if not impossible, to measure the input, and until such time as the free surface stabilizes, the instrument cannot adequately perform its intended function. Obviously this difficulty often disqualifies the instrument when in its intended setting it is subjected to rapid changes in velocity.

One important object of my invention is to eliminate the use of free surfaces in integrating accelerometers which employ liquid as the seismic element.

Another important object of my invention is to reduce the motion of the liquid to the very minimum which will allow the measure of a displacement.

Another important object of my invention is to provide an accelerometer which has substantially no moving parts and which is effectively free of all friction losses.

Still another important object of my invention is to provide an accelerometer which does not employ a solid mass as the seismic element.

Yet another important object of my invention is to provide an accelerometer capable of measuring instantaneous changes in velocity without the aid of special auxiliary integrating devices.

To accomplish these and other objects, my accelerometer includes a closed fluid system wherein the fluid is allowed to move a limited distance in the system in response to movement of the accelerometer case. The fluid system is defined as a closed continuous passage interrupted at two places by transverse extremely thin and flexible separators or diaphragms which divide the continuous fluid passage into two non-communicating portions. The diaphragms are located in enlarged chambers formed as part of the continuous passage and divide each of these chambers into two compartments. Fluids of different density fill the separate portions of the passage including the compartments of the chambers. Because the fluids are of different densities, movement of the instrument causes the denser of the fluids to move in a direction opposite to the system's motion while the lighter of the fluids is displaced by the denser fluid and moves in the same direction as the system. These moving fluids exert forces upon the diaphragms, and as will be better understood in the following detailed description, the displacement of each of the diaphragms in response to the forces applied against them by the fluids is proportional to the instantaneous change in velocity of the system or instrument itself.

As suggested above, my accelerometer directly indicates the instantaneous change in velocity of the instrument rather than the acceleration. The integration of the acceleration with respect to time is accomplished by a viscous damping effect which is built into the device. Because at least one portion of the passage interconnecting the compartments formed in the chambers is substantially smaller in cross section than the cross section of the compartment itself an intensified damping action is introduced into the system. The damping coefficient is a function of the fourth power of the ratio of the respective diameters of the passage and compartment and because the passage is so small as compared to the compartment, it will be appreciated that this viscous damping effect is of considerable magnitude. The damping effect can be further increased by using a fluid or fluids of higher viscosity and/or making the interconnecting passage longer.

The actual measurement of the change in velocity can be made in a number of ways. For example, an electrical bridge can be set up which includes as adjacent legs capacitances formed by the gaps between the diaphragms and one of the walls in each chamber. As the diaphragms move in response to movement of the fluids, the gaps are varied and the actual displacements of the diaphragms with respect to the walls of the chambers produce an output signal from the bridge circuit which is directly proportional to the displacements. Other similar systems can be used for making the displacement measurement as will be described in greater detail in the following specification.

These and other objects and features of my invention, along with its incident advantages will be better understood and appreciated from the following detailed description of one embodiment thereof, selected for purposes of illustration and shown in the accompanying drawings in which.

Figure 1:
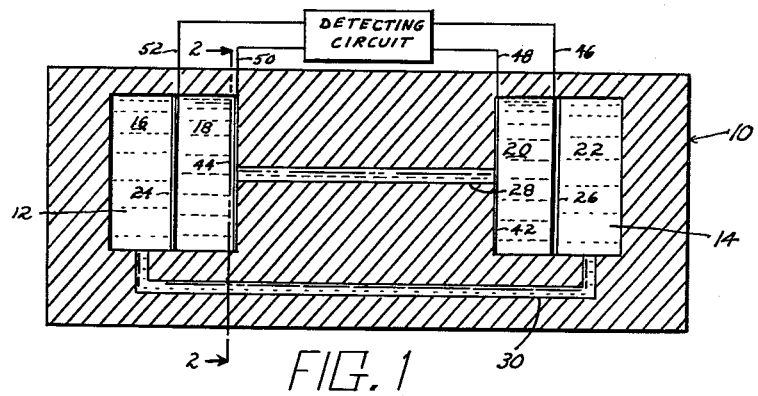
FIGURE 1 is a cross sectional view of an integrating accelerometer constructed in accordance with my invention.
Figure 2:
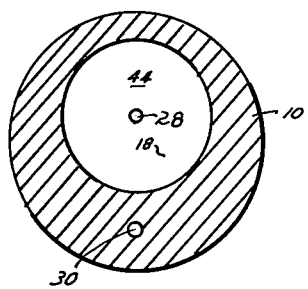
FIGURE 2 is a cross sectional view of the accelerometer shown in FIGURE 1 and taken along the corresponding section lines of that figure.

Before I present a detailed description of the embodiments of my invention shown in the drawings, the following mathematical analysis of an accelerometer is given to afford the reader a better understanding of the integrating effect of viscous damping.

The performance equation of an accelerometer is given as follows:

$$m\frac{d^2x}{dt^2} + c_\mathrm{d}\frac{dx}{dt} + kx = -m\frac{d^2y}{dt^2}$$

where
$x$=relative displacement of the seismic element with respect to the case of the instrument,
$y$=displacement of the case with respect to inertial space,
$m$=mass of the seismic element,
$c_\mathrm{d}$=viscous damping coefficient, and
$k$=elastic restraint acting on the seismic element.

As suggested in the preceding paragraphs, the elastic restraint exerted by the separators or diaphragms on the fluids (seismic element) is negligible. Therefore, the performance equation can be written as follows:

$$m\frac{d^2x}{dt^2} + c_\mathrm{d}\frac{dx}{dt} = -m\frac{d^2y}{dt^2}$$

If the force represented by $$m\frac{d^2x}{dt^2}$$

is negligible compared to the damping coefficient represented by $$c_d\frac{dx}{dt}$$

then the equation becomes $$c_d\frac{dx}{dt} = -m\frac{d^2y}{dt}$$

or $$x = \int_0^t \left(-\frac{m}{c_d}\frac{d^2y}{dt^2}dt\right)$$

From the foregoing equation it will be recognized by those skilled in the art that the desired conditions may be achieved by making the viscous damping coefficient $c_d$ very large compared to the mass $m$ and the residual elastic restraint $k$. Furthermore, when the damping coefficient $c_d$ is large compared to $m$, the effective sensitivity of the instrument relating displacement of the liquid with respect to the case to the velocity of the case with respect to inertial space, being $$\frac{m}{c_d}$$

is a small number. This assists in making the internal displacements the minimum necessary for measurement purposes.

In the foregoing paragraphs I stated that the damping coefficient is a function of the fourth power of the ratio of the diameters of the passage and compartment. The following mathematical analysis supports this statement.

The pressure difference or drop across a tube due to the viscous drag on the walls of the tube is given by Poiseuille's equation. In particular, for a circular cross section the expression is:

$$P_{in} - P_{out} = \mu \frac{8v_{mean}}{R^2} L$$

where $P_{in}$ = pressure at inlet of the tube,
$P_{out}$ = pressure at outlet of the tube,
$v_{mean}$ = mean velocity in the tube,
$L$ = length of the tube,
$\mu$ = viscous coefficient of the liquid, and
$R$ = radius of the tube.

The damping coefficient is defined as the ratio of damping force and velocity or $$c_d = \frac{F_{damping}}{v}$$

For a circular tube with a viscous liquid flowing through it at a mean velocity $v_{mean}$, the force is defined by the pressure drop across the tube times the area of the tube, or $$(P_{in} - P_{out})\pi R^2 = \mu 8 v_{mean} L \pi$$

Therefore, for a circular tube $$c_d = \mu 8 L \pi$$

Figure 6:
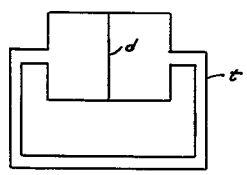
FIGURE 6 is a diagramatic view of a chamber and passage referred to in the mathematical analysis of the viscous damping coefficient.

Now the mean velocity of the liquid in the tube $t$ in FIGURE 6 bears the following relationship to the mean velocity at the diaphragm $d$ in that figure as derived from the equation of continuity for liquids.

$$v_{mean\ (d)} = \frac{R^2_{(t)}}{R^2_{(d)}} v_{mean\ (t)}$$

Because the pressure difference acting across the diaphragm is identical to the pressure difference acting across the tube by virtue of the construction, the forces acting on each are $$F_{(d)} = (P_{in} - P_{out})\pi R^2_{(d)}$$

and $$F_{(t)} = (P_{in} - P_{out})\pi R^2_{(t)}$$

Hence $$\frac{F_{damping\ (d)}}{F_{damping\ (t)}} = \frac{R^2_{(d)}}{R^2_{(t)}}$$

or $$F_{damping\ (d)} = \frac{R^2_{(d)}}{R^2_{(t)}} F_{damping\ (t)}$$

Therefore $$c_{d\ effective} = \frac{\frac{R^2_{(d)}}{R^2_{(t)}} F_{damping\ (t)}}{\frac{R^2_{(t)}}{R^2_{(d)}} v_{mean\ (t)}}$$

$$= \frac{R^4_{(d)}}{R^4_{(t)}} \times \frac{F_{damping\ (t)}}{v_{mean\ (t)}}$$

$$= \frac{R^4_{(d)}}{R^4_{(t)}} \mu 8 L \pi$$

From the foregoing those skilled in the art will appreciate that the viscous damping coefficient is in fact a function of the fourth power of the ratio of the radii or diameters of the passage and compartment. The reader will now better appreciate the following detailed description. However, before proceeding to that description, the reader should be mindful of the fact that to insure that the damping coefficient $c_d$ is very large with respect to the mass $m$ and the elastic restraint $k$, the damping coefficient $c_d$ must be a substantially constant value. Because the damping coefficient is directly proportional to the viscous coefficient $\mu$, the use of a Newtonian fluid will give to my system the desired constant damping coefficient value. Of course, only such a fluid will permit the integration as required by the equation of the relative displacement of the seismic element with respect to the case $x$.

The accelerometer shown in FIGURE 1 is generally embodied in a cylindrical casing 10 within which are formed cylindrical chambers 12 and 14. The chambers 12 and 14 are each divided into two compartments 16 and 18, and 20 and 22 by extremely thin and flexible diaphragms 24 and 26. The diaphragms 24 and 26 are secured to the marginal walls of the chambers 12 and 14 and prevent communication between the pairs of compartments formed in each chamber. Because the diaphragms are extremely thin and flexible, they yield easily to forces applied against them and exert negligible elastic restraint. A passage 28 extends longitudinally through the casing 10 and interconnects the compartments 18 and 20 while a second passage 30 formed in the casing and parallel to the passage 28 interconnects the compartments 16 and 22. Although the casing 10, the chambers 12 and 14 and the passages 28 and 30 are illustrated and described as cylindrical, the particular shape of these members is not confined to that specific configuration. Moreover, the chambers 12 and 14 need not be aligned as illustrated in FIGURE 1. Therefore, the configuration of each of the embodiments illustrated and described is merely exemplary and it must be understood that my invention is not confined in any sense to these specific shapes.

The passages 28 and 30 and the compartments with which they communicate are filled with fluid. The fluid in passage 28 and its communicating compartments 18 and 20 has a density different from the density of the fluid in the other passage and compartments. Those skilled in the art will appreciate that if the density of the fluid in the passage 28 and compartments 18 and 20 is greater than the density of the fluid in the other passage and compartments, acceleration of the casing 10 axially to the right as shown in FIGURE 1 will cause that denser fluid to move generally to the left in the casing while the other fluid will move to the right. Thus, the diaphragms 24 and 26 will yield to the left under the influence of the pressures of the fluids. This displacement of the diaphragms is a function of the change in velocity of the casing. Because the passages 28 and 30 have a diameter which is but a small fraction of the diameter of the compartments, the damping coefficient $c_d$ is extremely large. The viscous damping effect can be further increased by employing fluids in the system having a high viscosity.

Although the accelerometer illustrated and described in the foregoing paragraphs has two narrow passages 28 and 30, it will be appreciated that considerable damping can be accomplished by having only one of those passages of appreciably smaller diameter than the connected compartments. The particular ratios of sizes of passages and compartments, and the determination of whether both or but one of the passages is small with respect to the compartments are merely problems of design and are not part of the basic invention disclosed and claimed in this application.

Figure 3:
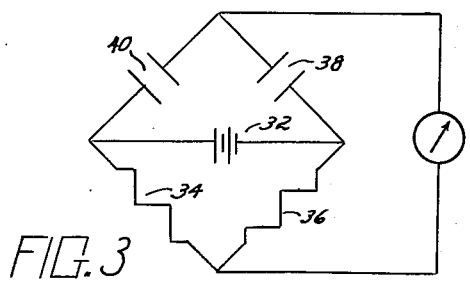
FIGURE 3 is a schematic diagram of a measuring circuit which can be incorporated into the device shown in FIGURE 1 to render a direct measurement of the change in velocity.

To measure displacement of the diaphragms to determine the instantaneous change in velocity of the casing, I may employ the simple bridge circuit shown in FIGURE 3. The bridge circuit includes a power source 32 and a pair of resistances 34 and 36 which are represented as a box identified as detecting circuit in FIGURE 1. The bridge also includes a pair of capacitors 38 and 40 having plates defined by the diaphragms and adjacent chamber walls. The capacitor 38 is defined by the diaphragm 26 and the wall 42 of the compartment 20 while the capacitor 40 is defined by the diaphragm 24 and the wall 44 of the compartment 18. The walls 44 and 42 and the facing surfaces of the diaphragms 24 and 26 are each provided with a conductive surface properly insulated from the casing 10, and the fluid which fills the passage 28 and compartments 18 and 20 preferably has a high dielectric constant. The leads 46 and 48 are connected to the conductive surfaces of the diaphragm 26 and the wall 42, respectively, while the leads 50 and 52 are connected respectively to the wall 44 and the conductive surface of the diaphragm 24. Each lead is also connected to the detecting circuit box shown in FIGURE 1. By means of this arrangement, a meter connected to the opposite corners of the bridge as shown in FIGURE 3 will record a signal proportional to the displacement of the diaphragms relative to their cooperating walls, as is well known to those skilled in the art. Although I have described the manner in which the displacement can be measured capacitively, it should be understood that numerous other means may be employed to accomplish the same purpose. For example, by using a conductive fluid between the diaphragms and the walls of the compartments, the change in resistance due to the displacement of the diaphragms may be measured in a bridge circuit, and that change of resistance would be a function of the displacement. Because of the fact that numerous well known electrical arrangements can be employed to measure the displacement, I do not intend to limit the breadth of my invention to any one of them.

As described above, my integrating accelerometer is capable of measuring the instantaneous change in velocity of the casing 10 in a longitudinal direction. It will be noted, however, that the device is insensitive to motion transverse to the longitudinal direction, for the system is balanced in this direction. An inspection of FIGURE 1 reveals that no motion of the fluids within the passages 28 and 30 and the compartments 16, 18, 20 and 22 occurs if the casing 10 is moved in any direction perpendicular to the axis of the casing 10. It should be noted also that although I have described the casing 10, the chambers 12 and 14 and the passages 28 and 30 as being cylindrical in shape, this particular configuration is unnecessary. For example, the casing, chambers and passages may be rectangular in cross section or any other shape without affecting the operation of the accelerometer. The particular shape selected is a matter of design.

Figure 4:
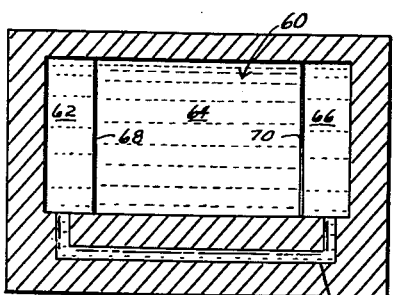
FIGURES 4 and 5 are diagramatic views of two additional embodiments of my invention.

The embodiment of my invention shown in FIGURE 4 is substantially the same as the embodiment of FIGURE 1 with the single exception that passage 28 has been eliminated and chambers 12 and 14 are combined as a single large chamber 60. The chamber 60 is divided into three compartments 62, 64 and 66 by diaphragms 68 and 70. The compartments 62 and 66 are interconnected by a passage 72. The compartments 62 and 66 and the interconnecting passage 72 are filled with one fluid while the compartment 64 is filled with a second fluid of different density. The single passage 72 which has a much smaller cross sectional area than the compartment 64 provides adequate viscous damping to perform the integration explained earlier.

If the accelerometer illustrated in FIGURE 4 is accelerated to the right as viewed in that figure and the fluid contained in the compartment 64 has a greater density than the fluid in the other compartments and the passage, the diaphragms 68 and 70 will displace to the left under the influence of the pressure exerted on them by the movement of the fluid. Just as in the embodiment in FIGURE 1, this displacement is a direct function of the change in velocity of the casing of the instrument. This displacement may be measured by any of the expedients suggested with respect to the embodiment of FIGURE 1.

Figure 5:
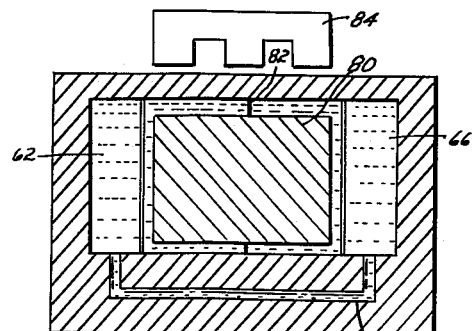

The embodiment of my invention shown in FIGURE 5 contains all of the elements of the embodiment in FIGURE 4 and in addition, includes a block 80 suspended in the fluid of compartment 64. This block 80 must of necessity have the same density as the fluid in which it is suspended. A pair of extremely thin wires 82 serve to center the block in what may be called a zero or reference position in the fluid of compartment 64 but they exert substantially no restraint upon the block when it moves with the fluid and responds to changes in velocity of the instrument casing. The block 80 peculiarly lends itself to an inductive measuring system which is suggested by the E-shaped magnet 84. Those skilled in the art will appreciate that the movement of the block 80 will be detected by the magnet 84 by virtue of changes in the area between the pole faces of the magnet and of the block. In this embodiment, the block 80 in effect is part of the fluid within which it is suspended for it will move with it and not relative to it in response to changes in velocity of the instrument.

From the foregoing description, those skilled in the art will appreciate that numerous modifications may be made of my invention without departing from the spirit thereof. For example, either one or both of the diaphragms 24 and 26 in the embodiment of FIGURE 1 may be turned at any angle to the vertical position to divide the chambers 12 and 14 into separate compartments. Moreover, the damping effect may be accomplished by other means than those illustrated. For example, the narrow passage 28 and/or 30 may be replaced by a larger passage which is filled with a porous media. Such a media would in effect form a restricted passage between the larger compartments to introduce integrating effect into the instrument. In its simplest form, the instrument need only have an imbalance of fluid densities along the path of motion to be measured to respond to changes in velocity of the instrument. Such an integrating accelerometer vectorially resolves the changes in velocity and detects the velocity component along its sensitive axis. Because so many modifications suggest themselves, I do not intend to limit the breadth of my invention to the embodiments as illustrated and described. Rather, I intend that the breadth of my invention be determined by the appended claims and their equivalents.

The foregoing description has been confined generally to integrating accelerometers which measure the instantaneous change of velocity of a body moving along a path. However, the same configurations of my invention may be employed to measure acceleration by increasing the elastic restraint K upon the fluids. This may be accomplished by stiffening the system by such means as moving one of the diaphragms out of the enlarged chamber and into the narrow passage. Alternatively, a third diaphragm could be introduced into the narrow passage. As still another means, the closed and continuous passage could be of substantially uniform cross section throughout. In this case the force represented by $$m\frac{d^2x}{dt^2}$$

would not be negligible with respect to the damping coefficient $$c_d\frac{dx}{dt}$$

In any of these arrangements, the integration would not take place as an integral part of the system's operation.

I claim:

1. Means for measuring the change in velocity of a member moving along a path in space comprising a closed and endless passage formed in the member, said passage having non-yielding walls, two liquids of different densities and having substantially constant viscous coefficients completely filling the passage and adapted to displace in the passage in response to a change in velocity of the member along the path, yieldable means secured to the walls physically separating the two liquids in the passage and exerting negligible elastic restraint on the liquids, and means responsive to the displacement of the liquids caused by changes in velocity of the member along the path.

2. An integrating accelerometer adapted to measure changes of velocity when moved along a path comprising a casing, a pair of compartments formed in the casing, a passage made of non yielding material and substantially smaller in cross-section than the compartments and interconnecting the compartments, a viscous Newtonian liquid filling the passage and compartments, a thin and flexible member exerting negligible elastic restraint closing each of the compartments and sealing the liquid in the passage and compartments, means including the thin and flexible members forming a closed fluid chamber separate from the compartments and passage, a non compressible liquid of different density than the Newtonian liquid filling the closed chamber, and means responsive to displacement of the liquids for measuring the change in velocity of the casing.

3. An integrating accelerometer comprising a pair of closed chambers having rigid walls, thin and flexible separators extending across each of the closed chambers and dividing each into two separate compartments, a passage made of rigid material interconnecting one compartment in one chamber with one compartment in the other chamber, a second passage made of rigid material interconnecting the other compartments, incompressible fluids of different densities filling each of the passages and their communicating compartments, said separators exerting negligible elastic restraint upon the fluids, and means for measuring the displacements of the separators in response to movement of the fluids.

4. Apparatus of the class described comprising a casing, a closed fluid passage formed in the casing and entirely defined by rigid walls, a pair of thin and flexible separators extending across the passage and dividing the passage into two separate portions, said portions having parallel parts, Newtonian liquids of different densities completely filling the respective portions of the passage, said separators exerting negligible restoring forces upon the liquids, and means responsive to the deflection of at least one separator for measuring the change in velocity of the casing in space.

5. Apparatus of the class described comprising a casing, front and rear rigid chambers formed in the casing, separators connected to the walls of each chamber and dividing each into two fluid tight compartments, a passage having rigid walls interconnecting one compartment of one chamber with one compartment of the other chamber, said passage being of smaller cross section than the compartments which it interconnects, a viscous Newtonian liquid filling that passage and its related compartments, a second passage having rigid walls interconnecting the other compartments, a second liquid of different density filling the second passage and its related compartments, said separators exerting negligible elastic restraint upon the liquids, and means responsive to movement of the separators for indicating the change in velocity of the casing in a forward and rearward direction.

6. Apparatus of the class described comprising a case, a pair of parallel passages in the case, a pair of chambers in the case, one chamber connecting one pair of adjacent ends of the passages and the other chamber connecting the other adjacent ends of the passages, said chambers and passages being entirely formed of rigid walls, separators disposed in each chamber and preventing fluid communication between the adjacent ends of each passage, said separators exerting negligible restraint against deformations at least one of the passages having a cross-sectional area substantially smaller than the cross sectional area of the chambers, a viscous Newtonian liquid filling that passage and the portions of the chamber in fluid communication with it, a second non-compressible liquid of different density filling the other passage and the portions of the chambers in fluid communication with it, and means responsive to the movement of at least one separator for measuring the change in velocity of the case in a direction parallel to the passages.

7. A device as defined in claim 5 further characterized by each of the chambers having a wall parallel to the enclosed separators and the last named means including an electrical circuit which responds to the change in the gap length between the separators and the parallel walls.

8. Apparatus for detecting changes in velocity along a path comprising a case adapted to be secured to a body moving along the path, a closed and endless passage entirely defined by rigid walls formed in the case, at least one enlarged chamber formed as part of the passage, a pair of thin and flexible members extending across different parts of the passage and dividing the passage into two non-communicating portions, at least one of the members being disposed within the enlarged chamber and one of the members lying ahead of the other member with respect to the path of travel of the case, Newtonian liquids of different densities filling the two portions of the passage, said members exerting negligible elastic restraint against displacement of the liquids, and means responsive to the displacement of at least one of the members for indicating the change of velocity of the body carrying the case along the path.

9. Apparatus for detecting a change of velocity of a body moving along a path comprising a case adapted to be carried by the body, an endless passage entirely defined by rigid walls formed in the case, said passage having at least one portion disposed at an angle to a plane normal to the path along which the change of velocity is to be measured, a pair of thin and flexible separators extending across the passage with one of the separators disposed in the one portion of the passage, said separators dividing the passage into two non-communicating portions and exerting negligible restraint against displacement, Newtonian liquids of different densities filling the non-communicating portions of the passage, and means responsive to the displacement of the liquids in the passage for indicating the change in velocity of the body moving along the path.

10. Apparatus for detecting a change of velocity of a body moving along a path comprising a case adapted to be secured to the body, an endless passage defined by rigid walls formed in the case and lying in a plane parallel to the path of travel of the body carrying the case, a pair of thin and flexible separators extending across the passage and one lying ahead of the other with respect to the path of travel of the body, said separators dividing the passage into two non-communicating portions, Newtonian liquids of different densities filling the two portions, said separators exerting negligible restoring forces upon the liquids and means responsive to the displacement of the liquids in the passage for indicating the change in velocity of the body carrying the case.

11. Apparatus for detecting changes in velocity along a path comprising a case adapted to be moved along the path, a closed and endless passage formed in the case, Newtonian liquids of different density filing the passage, thin and flexible members extending across the passage and physically separating the liquids of different density, said members exerting negligible restraint against displacement of the liquids, said liquids exerting unequal pressures upon the members in response to a change of velocity of the case along the path, said liquids exerting equal pressures on the members in response to a change in velocity of the case along a course in a plane normal to the path, and means for measuring the displacement of at least one member due to the unequal pressures exerted by the liquids on the member.

12. A device as defined in claim 11 further characterized by an enlarged chamber formed as part of the passage with the member whose displacement is measured being located in the chamber.

13. A device as defined in claim 12 wherein each of the members lie in the enlarged chamber and the area of the members are substantially greater than the cross sectional area of the passage.

14. Apparatus of the class described comprising a casing, a closed liquid passage formed in the casing and entirely defined by rigid walls immovable with respect to one another, a pair of flexible separators extending across the passage and dividing the passage into two separate portions, Newtonian liquids of different densities completely filling the respective portions of the passage, said separators exerting negligible restoring forces upon the liquids, and means responsive to the displacement of one of the liquids for measuring the change in velocity of the casing.

References Cited in the file of this patent

UNITED STATES PATENTS

| | | |
|---|---|---|
| 2,552,722 | King | May 15, 1951 |
| 2,697,594 | Stanton | Dec. 21, 1954 |
| 2,778,624 | Statham | Jan. 22, 1957 |
| 2,840,366 | Wing | June 24, 1958 |

FOREIGN PATENTS

| | | |
|---|---|---|
| 533,423 | France | Dec. 9, 1921 |
| 131,184 | Great Britain | Aug. 21, 1919 |